United States Patent Office 2,949,929
Patented Aug. 23, 1960

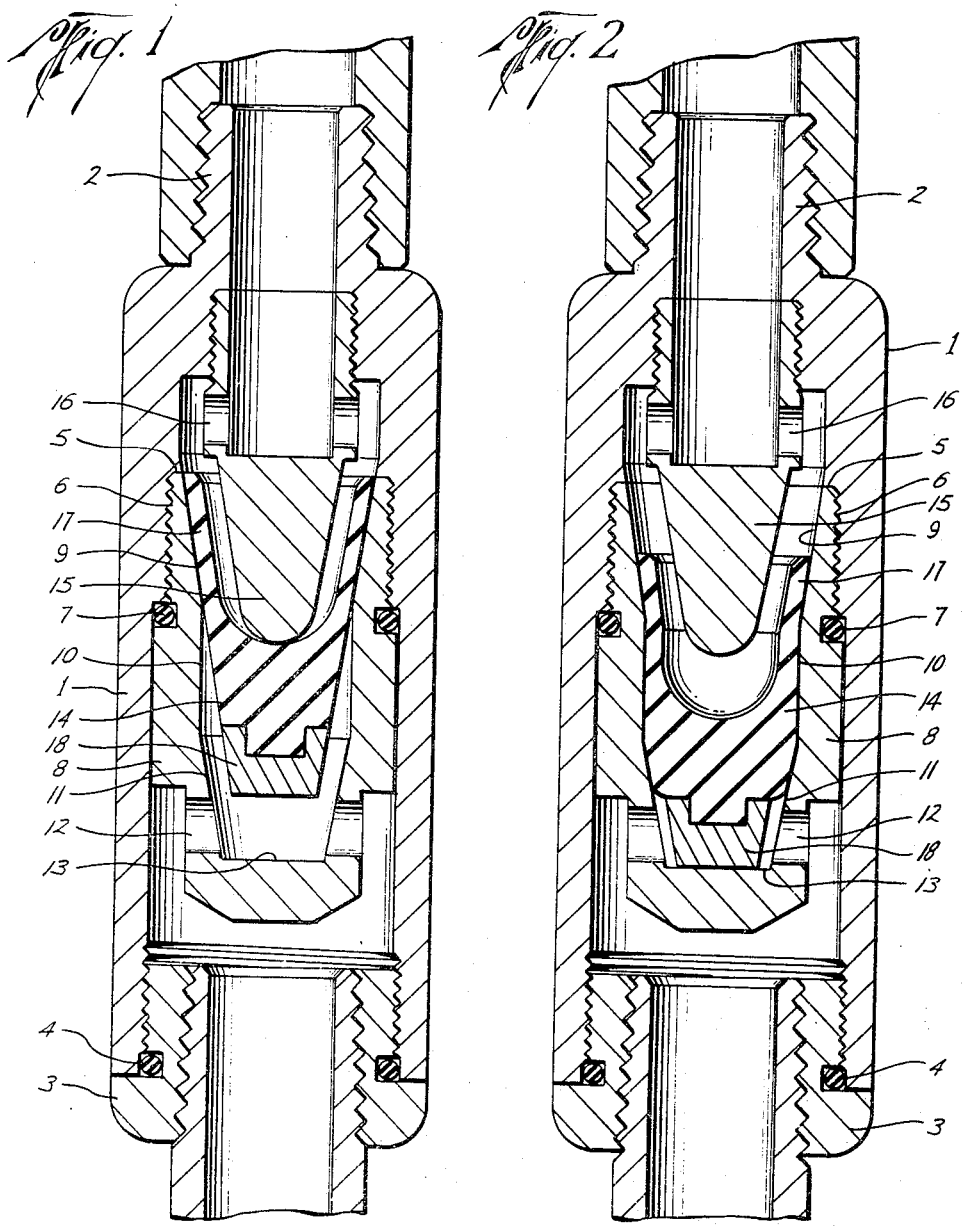

2,949,929
CHECK VALVE

Howard H. Moore, Jr., Houston, and William H. Dietz, Bellaire, Tex., assignors to Camco, Incorporated, Houston, Tex., a corporation of Texas Filed Feb. 3, 1958, Ser. No. 712,773

8 Claims. (Cl. 137—516.29)

This invention relates to an improved check valve assembly especially adapted for installation in the production tubing string of an oil or gas well or the like to respond to opposing fluid pressures for permitting free flow in the forward direction and effectively sealing against backflow.

An object of the invention is to provide a flow control unit comprised of a housing having opposite end coupling connections for easy insertion in a flow line and including a pressure actuated piston having a limited range of travel in either direction in response to pressure differentials and a hollow extension wall or annular skirt of nonmetallic elastic deformable material projected from the piston head in the direction of flow to be accommodated and normally engaged peripherally in surface wiping contact with the interior of a circular wall of the housing which defines a flow passageway through the unit and is tapered or has a decreasing diameter in the direction of reverse flow to be sealed whereby piston travel to its forward limit positions the elastic skirt within the larger aera of the passageway and force to contract the expanded elastic skirt away from the large diameter passage wall is least resisted and a small deflection affords the widest flow clearance and piston travel toward its other limit progressively crowds the deformable skirt into tighter sealing conformity with the tapered passage wall and reverse flow pressure concurrently exerted interiorly of the skirt holds the same distended more snugly against the wall of the passageway whereby the fluid head being sealed effects a tight seal and the greater the head, the more leak resistant will be the seal, with the result that pressures in excess of five thousand pounds per square inch remain sealed and unlimited pressures can be effectively valved within the strength limits of materials employed.

Another object of the invention is to provide a check valve unit of the piston skirt type wherein that portion of the housing wall surface with which the rubber skirt has sealing contact is continuously smooth, both circularly and axially, and is uninterrupted by grooves, ribs, apertures or other irregularities such as would tear or unduly wear the skirt because of unsymmetrical deformation or extrusion into surface breaks of fragments of the movable rubber wall under confined fluid pressures.

A further object of the invention is to provide a piston valve deformable skirt of frusto-conical shape and of a preformed radial dimension to make sealed surface contact with the wall of the housing passageway at zero pressure and to form the skirt contacting wall of the passageway with tapered portions in two spaced apart steps or end zones in relation to piston travel range and with an intermediate axial zone of substantially cylindrical or other suitable shape to present successive skirt wiping surfaces which are angularly related in the direction of piston movement for conformity thereto by the deformable skirt wall, both progressively during piston travel and statically when the piston is at any point of rest, whereby bending of the skirt along its length aids in working the skirt material and better resists fluid blow-by tendency than would a continuous straight line contact.

In the accompanying drawing Figs. 1 and 2 are longitudinal sectional views of the improved valve assembly illustrating the floating valve element at opposite limits of piston travel.

For manufacturing purposes, the valve housing is comprised of several screw machine steel parts including a hollow case or cupped barrel 1 having a reduced diameter coupling pin 2 at one end. This pin 2 is shown as being exteriorly screw threaded for connection with the end of a flow pipe or section of a well production tubing string. At its opposite and full diameter end the casing 1 has internal threads and detachably receives a coupling part, such as a reducer plug or closure bushing 3 having an internally screw threaded bore for connection with another tubing string joint or with any conventional well tool or work performing device. The threaded joint between the casing 1 and the plug 3 may be packed by an O-ring, as indicated at 4. Production oil or gas which is permitted to pass through the unit enters the end thereof at the coupling plug 3 and leaves through the bore of the connector pin 2.

Near the exit end, the wall of the casing 1 is internally shouldered to form an abutment seat 5 and is internally screw threaded, as at 6. Mounted by the screw threads 6, which are packed by an O-ring 7 and seated against the abutment 5, is one end of a tubular insert or cupped bushing 8 whose interior provides a pasageway chamber of decreasing diameter in the direction opposite to the direction of free fluid flow toward the coupling pin 2, and preferably this chamber is a two-stage or stepped tapered design and includes a tapered end zone of larger area 9, a central cylindrical zone 10 and a tapered end zone of smaller area 11. Projecting laterally through the wall at the smallest end of the internally tapered region or zone 11 is a port or ports 12 communicating the interior chamber space of the bushing 8 with the chamber space exteriorly of the bushing and within the casing 1 adjacent the closure plug 3.

Beyond the region of the communicating port 12 a laterally inwardly extending wall or shoulder on the bushing 8 affords an internal limit stop abutment 13 for a piston 14 housed for axial travel within the bushing 8. When the bushing is of cup shape, as illustrated, its base or end closure wall constitutes the abutment stop 13 for limiting piston travel influenced by fluid pressure upon backflow tendency. Axially spaced forwardly from the limit stop 13 is the other piston limit stop afforded by the nose or tip of a tapered stem or stud 15 which terminates in a hollow end portion having a threaded or press fit within the hollow connector pin 2 and communicating through a lateral port or ports 16 with the housing passageway.

The extended stem 15 projects into the chamber of the bushing 8 and is in radially spaced concentric relation with the interiorly tapered bushing wall. Axially overlapping and radially spaced from the stem 15 and in seating contact with the interior surface of the bushing 8 is the annular skirt 17 projected from the solid head of the piston 14 and conveniently formed integrally therewith by molding from an oil resistant synthetic rubber such as neoprene or other suitable nonmetallic elastic deformable material. Preferably, the skirt 17 has a relatively thin frusto-conical wall preformed to mate with the surface of the tapered zone 9 and to contact therewith under a slight compressive stress sufficient to seal the passageway at zero fluid pressure when the piston is at its forward travel limit in contact with the stop abutment stem 15.

In this last mentioned position of the parts as seen in Fig. 1 and when the control unit is installed in an oil well production string, the upward flow of fluid entering the housing at the coupling 3 passes through the lateral port 12 and up through the clearance between the bushing 8 and the head of the piston 14 and the fluid pressure exteriorly of the skirt, even though only slightly in excess of that above the valve, will deflect or contract the thin elastic wall of the skirt 17 inwardly away from the bushing for free passage of fluid through the valve chamber and out of the port 16 and the connector pin 2.

Should pressure differential on opposite faces of the rubber skirt approximate zero, the skirt wall will remain or be elastically restored in annular contact with the bushing interior surface, and when fluid pressure acting on the inside of the skirt exceeds the pressure below the valve, the expansive force on the elastic material will cause a tighter annular fit of the contacting surfaces. At the same time the back pressure or weight of the liquid above the valve will tend to depress or slide the piston away from the limit stop 15 and carry the tapered skirt along the tapered surface 9 of the bushing and into a contracted diametrical portion of the tapered passageway for a construction or crowding of the material of the elastic skirt and a progressively increased pressure seal. The extent of piston slide travel will be dependent on the range of differential pressures on opposite sides of the piston but travel eventually will be stopped by piston abutment with the limit stop 13. Relatively high pressure internally of the piston will exert an expansive force on the elastic material with the result that the higher the internal pressure, the tighter will be the seal. The outwardly pressed elastic skirt wall will bend at the intersection of the angularly related zones 9 and 10 and conform to the adjacent surfaces of both the tapered zone 9 and the cylindrical zone 10 and such angular contact will better resist blow-by tendency. During piston travel successive increments in the length of the skirt bend from tapered to cylindrical shape to assume the shape of the passage wall being wiped thereby and the material of the skirt is thereby kneaded or worked elastically, which beneficially aids in keeping the soft rubber live and pliable.

As the piston approaches its final travel limit against the stop 13, the axial length of the piston head will shorten under the high pressure internally of the piston and displacement of the elastic material will be radially outwardly and bulge the piston head into peripheral contact with the surrounding portions of the angularly related cylindrical zone 10 and the tapered end zone 11 somewhat in the manner illustrated in Fig. 2.

The end portion of the piston 14 is desirably held against radial expansion as by having fitted thereto a metal cap 18 whose base can seat against the stop abutment 13 and whose axially extending wall is of an outside diameter somewhat smaller than the diameter of the tapered passageway in the region of the port 12 and is of an axial length to extend farther forward from the stop abutment 13 than does any part of the port opening. The stiff facing afforded by the cup 18 insures communication clearance within the small end of the piston chamber at all times and precludes extrusion into the port 12 of the soft flexible piston material. Whenever fluid pressure at the entry port 12 exceeds the pressure on the other side of the piston, the piston will be shifted back into the larger chamber area of the passageway and in that position, as seen in Fig. 1, the skirt can be blown inwardly out of sealing contact with the casing wall for accommodating free passage of the pressure fluid.

The foregoing specification has dealt with a preferred embodiment of the invention and it is to be understood that modifications may be made as come within the scope of the claims which follow.

What is claimed is:

1. A check valve comprising a hollow barrel for connection in a pressure fluid flow line, a bushing insert fixed within the barrel, said insert having an annular wall defining a central piston receiving chamber open at one end and terminated at its opposite end in a laterally projected piston stop abutment, the interior surface of said wall being tapered from the open end of the chamber in two axially spaced apart zones, one adjacent said open end and the other adjacent the opposite end of the chamber and the wall surface between said tapered zones extending in angular relation to both tapered surfaces, a central stem fixed within the barrel and projected in concentric radially spaced relation into the open end of the chamber and terminated in a piston stop abutment in axially spaced relation to the first mentioned stop abutment, and a floating piston having a head confined within the chamber for movement between the limits of said axially spaced abutment stops and having an annular skirt of elastic deformable nonmetallic material projecting between said stem and the wall of the insert and being of preformed frusto-conical exterior shape and of a diametrical dimension to have a seal fit at zero fluid pressure with the tapered surface of the insert wall at the limit of piston travel into abutment with said stem, said skirt being yieldable to collapse inwardly under fluid pressure exteriorly thereof and to conform to said insert wall surface under fluid pressure interiorly of the skirt and throughout the range of piston travel.

2. In a check valve assembly, a housing having a tubular passageway of which a portion is tapered in the direction of fluid flow to be checked, a piston movable axially within the passage in response to fluid pressure on opposite faces thereof and toward one limit in response to fluid pressure on one face and toward another limit in response to fluid pressure on the other face, said piston having a head and an annular skirt of elastic deformable material projecting from said head in the direction opposite to said direction of passageway taper and being of a peripheral dimension to have a slidable seal fit on the interior surface of said tapered passageway in the region of its large area at one limit of piston movement, said skirt being deformable away from its seal fit to the tapered passageway in response to fluid pressure thereon in the direction opposite to said direction of passageway taper for the passage thereby of pressure fluid and being deformable into a tighter sealing fit to the passage surface in response to fluid pressure thereon in the direction of said direction of passageway taper and also in response to movement of the piston under the last mentioned fluid pressure as piston movement carries said skirt into the decreasing area of the tapered passageway, the skirt engageable portion of said tubular passageway within the range of piston movement being comprised of a pair of axially spaced apart tapered zones and an intermediate substantially cylindrical zone between the tapered zones so that the interior surfaces of succeeding zones are angularly related and said deformable skirt wipes over the angularly related zones and progressively conforms thereto during piston movement to make sealing contact simultaneously on angularly related surfaces under fluid pressure on the inside of the deformable skirt.

3. In a check valve assembly, a housing having a tubular passageway of which a portion is tapered in the direction of fluid flow to be checked, a piston movable axially within the passage in response to fluid pressure on opposite faces thereof and toward one limit in response to fluid pressure on one face and toward another limit in response to fluid pressure on the other face, said piston having a head and an annular skirt of elastic deformable material projecting from said head in the direction opposite to said direction of passageway taper and being of a peripheral dimension to have a slidable seal fit on the interior surface of said tapered passageway in the region of its large area at one limit of piston movement, said skirt being deformable away from its seal fit to the tapered passageway in response to fluid pressure thereon in the direction opposite to said direction of passageway taper for the passage thereby of pressure fluid and being deformable into a tighter sealing fit to the passage surface in response to fluid pressure thereon in the direction of said direction of passageway taper and also in response to movement of the piston under the last mentioned fluid pressure as piston movement carries said skirt into the decreasing area of the tapered passageway, said housing having a lateral flow port communicating with the passageway near the small area of its tapered portion and the piston having a rigid nondeformable peripheral portion in the region thereof which moves into alignment with said lateral port upon piston movement toward its limit in the direction of said passageway taper, the axial length of said nondeformable portion being in excess of port dimension whereby to overlap said port and preclude alignment therewith of any portion of said deformable skirt.

4. In a check valve assembly as in claim 3 wherein said housing has an abutment formation engageable by said rigid nondeformable peripheral portion as a limit stop to piston movement in the direction of passageway taper and the diameter of said rigid nondeformable portion is less than the diameter of the passageway at said lateral port to maintain communication at all times through the port with the passageway.

5. In a check valve assembly, a hollow barrel having a piston chamber therein between axially spaced apart flow connections, a floating piston contained within said chamber for travel in opposite directions in response to fluid pressure differential on opposite sides thereof, axially spaced apart piston engageable abutments on the barrel defining opposite limits of piston travel, said piston including a piston head and a skirt of elastic deformable material projecting from the piston head in the direction opposite to the direction of fluid flow to be checked, said skirt having a diametrical dimension in relation to said piston chamber that the peripheral face of the skirt throughout the entire range of piston travel from one to the other of said limits is in circularly continuous wiping contact with the interior surface of the chamber passage under fluid pressure acting on the inside of the skirt and being contractible away from the wall under fluid pressure acting on the outside of the skirt, said passage interior surface including axially successive zones, one of which is substanitally cylindrical and the other of which is tapered in the direction of flow to be checked and with each of which zones the skirt peripheral surface has wiping contact relation in the travel of the piston between its limits, said tapered zone being located intermediate the cylindrical zone and that one abutment which limits piston travel under pressure of fluid inside the skirt.

6. In a check valve assembly, a housing having a fluid flow passage including a valve chamber whose wall throughout a substantial axial portion thereof is tapered in the direction of fluid flow to be checked, a stop abutment in the chamber adjacent the smaller end of the tapered chamber wall, an axially elongated stem dependently mounted by the housing centrally within said chamber in radially spaced relation with the chamber wall at its larger end and terminated in a stop seat axially spaced from said stop abutment and a cup-shaped piston axially shiftable within the chamber in response to differential fluid pressures on opposite sides thereof and comprised of a head located within the space between the stop abutment and the stop seat for movement in one direction into engagement with the terminal stop seat on said stem and in the other direction into engagement with said stop abutment and a flexible annular skirt wall projected axially from the piston head to a free end which is receivable within the radial space surrounding said elongated stem on movement of the piston head toward the terminal stop seat, said flexible skirt wall having its peripheral face tapered toward the piston head and of a diameter at said free end in correspondence with the chamber wall at its larger end to bear normally with an annular sealing fit on the chamber wall throughout the range of piston movement and the flexibility of said skirt wall enabling the same to be blown radially inwardly away from the chamber wall in response to a dominant fluid pressure differential acting in a direction opposite to said taper.

7. In a check valve assembly, a housing, a fluid flow passage therein having a portion tapered oppositely to forward fluid flow, a piston movable in said passage to a forward limit in response to dominant pressure of forward flow fluid and to a back limit in response to dominant pressure of fluid to be checked, axially spaced apart stops on the housing engageable by the piston to establish said limits, said piston including a head and an annular skirt of elastic deformable material projecting forwardly from said head and peripherally providing a sealing surface slidable on the housing and being of an axial length exceeding the axial space between said limit stops and of a diameter to be in sliding seal engagement with said tapered passage portion at all times and in all axial positions of the skirt within the aforesaid limits of piston movement and in the absence of an inward deforming forward fluid flow force on the periphery of the skirt, said tubular passageway having the region thereof on which the elastic skirt has slide bearing between the limits of piston movement, arranged as axially successive zones with the interior surfaces of succeeding zones angularly related to one another and to which axially successive portions of the deformable skirt conform upon engagement therewith and in response to fluid pressure acting on the inside of the skirt.

8. In a check valve assembly, a housing, a fluid flow passage therein having a portion tapered oppositely to forward fluid flow, a piston movable in said passage to a forward limit in response to dominant pressure of forward flow fluid and to a back limit in response to dominant pressure of fluid to be checked, axially spaced apart stops on the housing engageable by the piston to establish said limits, said piston including a head and an annular skirt of elastic deformable material projecting forwardly from said head and peripherally providing a sealing surface slidable on the housing and being of an axial length exceeding the axial space between said limit stops and of a diameter to be in sliding seal engagement with said tapered passage portion at all times and in all axial positions of the skirt within the aforesaid limits of piston movement and in the absence of an inward deforming forward fluid flow force on the periphery of the skirt, said deformable skirt being preformed to an exterior taper substantially corresponding with the taper of said passageway and is of a peripheral dimension to make seal contact at zero differential pressure with the tapered passageway surface in the region of its large area.

References Cited in the file of this patent
UNITED STATES PATENTS

| | | |
|---|---|---|
| 2,148,850 | Deakins | Feb. 28, 1939 |
| 2,771,091 | Baker | Nov. 20, 1956 |

FOREIGN PATENTS

| | | |
|---|---|---|
| 144,437 | Australia | Dec. 10, 1951 |